United States Patent [19]

Smith

[11] 4,090,357
[45] May 23, 1978

[54] CONNECTING LINK

[75] Inventor: Floyd O. Smith, Portland, Oreg.

[73] Assignee: ESCO Corporation, Portland, Oreg.

[21] Appl. No.: 811,450

[22] Filed: Jun. 29, 1977

[51] Int. Cl.² .............................................. F16G 15/04
[52] U.S. Cl. ............................................ 59/85; 59/87
[58] Field of Search .......................... 59/85, 86, 93, 87

[56] References Cited

U.S. PATENT DOCUMENTS

| 761,812 | 6/1904 | Austin | 59/85 |
|---|---|---|---|
| 2,052,066 | 8/1936 | Younie | 59/85 |
| 2,287,293 | 6/1942 | Clark | 59/87 |
| 2,447,921 | 8/1948 | Thomas | 59/86 |
| 4,035,095 | 7/1977 | Hughes | 59/85 |

FOREIGN PATENT DOCUMENTS 1,196,028  11/1958  Germany ............................... 59/85

Primary Examiner—Carl E. Hall
Assistant Examiner—Gene P. Crosby
Attorney, Agent, or Firm—Tilton, Fallon, Lungmus & Chestnut

[57] ABSTRACT

A connecting link formed of a pair of identical generally C-shaped elongated elements each having an interior pin at a first end and an interior pin-receiving aperture at a second end with the interior of the first end being contoured to mate with the exterior of the second end of another link whereby the elements are first moved transversely of each other to position the second end of each of the elements within the first and second ends of the other of the elements and are thereafter moved longitudinally of each other to engage the pins and apertures to assemble the link.

7 Claims, 4 Drawing Figures

CONNECTING LINK

BACKGROUND AND SUMMARY OF INVENTION

This invention relates to a connecting link and, more particularly, to a link in which normal tension stress is carried by a pair of identical generally C-shaped elongated elements in a manner making their interconnection more secure.

Connecting links of the type contemplated by the invention are used in a wide variety of applications as repair links for chains and, when the repair links are suitably designed, facilitate the repair of chains without the need for special tools.

Inasmuch as connecting links are often used to join two sections of a broken chain, it is important that they be installed in a relatively short space of time in a manner providing a maximum amount of strength. An example of a prior art approach to meet this objective is illustrated in U.S. Pat. No. 2,052,066, granted Aug. 25, 1936 with a much earlier example being illustrated in U.S. Pat. No. 761,812, granted June 7, 1904. Additionally, because connecting links are often used as repair links in the field at points remote from machine shops, it is important that the links be simple and efficient in form so that they can be installed by an unskilled mechanic under less than ideal working conditions.

The invention herein is specifically directed to a connecting link formed of a pair of identical generally C-shaped elongated elements each having an interior pin at a first end and an interior pin-receiving aperture at a second end with the interior of the first end being contoured to mate with the exterior of the second end. The link so formed is assembled by first moving the elements transversely of each other to position the second end of each of the elements within the first and second ends of the other of the elements and thereafter moving the elements longitudinally of each other to engage the pins and apertures. With these features of construction and assembly, it is clear that normal tension stress actually provides a more secure interconnection between the elements operating to maintain the link in assembled form in its strongest mode with little or no stress on the pins and pin-receiving apertures.

The problems of the prior art have been focused in the area of the interconnection between the elements that make up the connecting link. The normal tension stress applied to a chain utilizing a prior connecting link structure has usually tended to break the interconnection between the elements. I have solved the problems previously encountered by providing a simplified design in which little or none of the normal tension stress is carried by the pins and pin-receiving apertures — exactly the opposite of the structural concepts heretofore utilized. The connecting link of the invention can also provide a smooth "normal" link in profile to conform to the size and shape of the links in the joined sections. Additionally, I have found it advantageous to provide the pins and pin-receiving apertures with transverse bores alignable with each other after engagement of the pins and pin-receiving apertures to receive a fastener such as a rivet to complete assembly of the link.

Other objects and advantages of the invention may be seen in the details of the ensuing specification.

DETAILED DESCRIPTION

The invention is described in conjunction with the accompany drawings, in which

Figure 1:
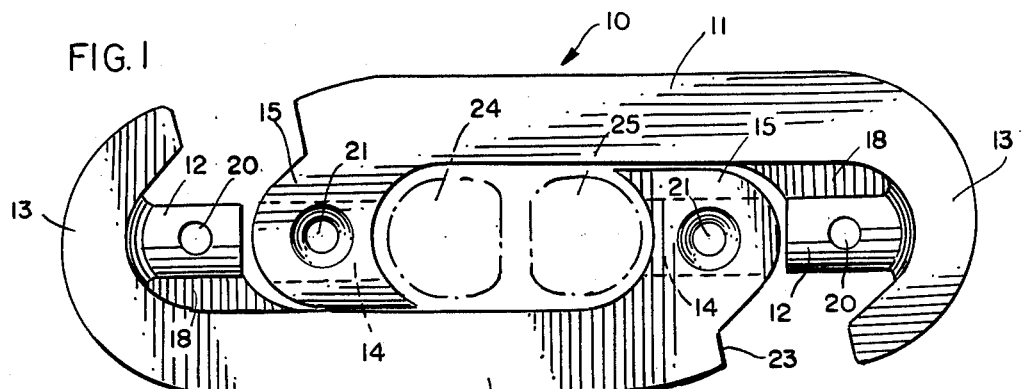
FIG. 1 is a front elevational view of a partially assembled connecting link in accordance with the present invention.
Figure 3:
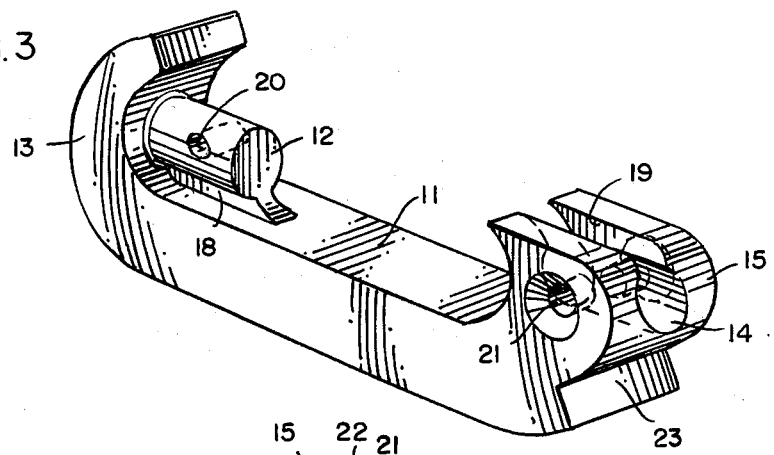
FIG. 3 is a perspective view of an element of a connecting link in accordance with the present invention.
Figure 4:
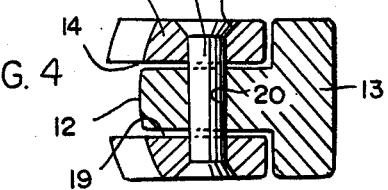
FIG. 4 is a cross-sectional view taken on the line 4—4 of FIG. 2 with the connecting link fully assembled.

In the illustration given and with reference first to FIG. 1, the numeral 10 designates generally a connecting link in accordance with the present invention. The connecting link 10 includes a pair of identical generally C-shaped elongated elements 11, each of the elements 11 having an interior pin 12 at a first end 13 and an interior pin-receiving aperture 14 (as shown in FIG. 3) at a second end 15 with the interior of the first end 13 of each of the elements 11 being contoured to mate with the exterior of the second end 15 of the other of the elements 11. With these features of construction, the link 10 is assembled by first moving the elements 11 transversely of each other to position the second end 15 of each of the elements 11 within the first and second ends 13 and 15 of the other of the elements 11 and thereafter moving the elements 11 longitudinally of each other to engage the pins 12 and apertures 14.

Figure 2:
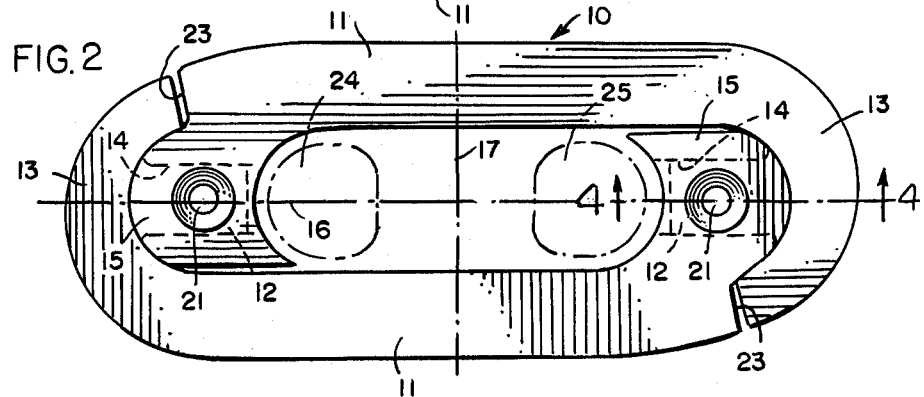
FIG. 2 is a front elevational view similar to FIG. 1 with the connecting link more fully assembled.

Referring to FIG. 2, the link 10 is preferably oblong having a major axis 16 and a minor axis 17 with the transverse movement of the elements 11 being in the direction of the minor axis 17 and the longitudinal movement of the elements 11 being in the direction of the major axis 16. The pins 12 and apertures 14 are advantageously cylindrical having their axes parallel to the major axis 16 and perpendicular to the minor axis 17 and preferably coinciding with the major axis 16 of the link 10. Each of the pins 12 has its outer cylindrical surface joined by a thin web 18 to the corresponding with one of the elongated elements 11 adjacent the first end 13 thereof with each of the apertures 14 being defined by the inner surfaces 19 and 20 of the numbers 21 and 22 which further define a slot 23 to receive the web 18 of the other one of the elongated elements 11 adjacent the second end 15 thereof. The pins 12 and members 21 and 22 advantageously have transverse bores 24 and 25, respectively, alignable with each other after engagement of the pins 12 and apertures 14 to receive a fastener such as a rivet 26 to maintain the elements 11 in assembled relation. The first end 13 of each of the elements 11 engages a shoulder 27 of the second end 15 of the other of the elements 11 with normal tension stress thereby being carried by the elements 11 rather than by the pins 12 and apertures 14.

With these features of construction, the connecting link 10 of the present invention is well suited for use as a repair link for joining two sections of chain. The two sections of chain will include two end links such as 28 and 29 (shown in phantom in FIG. 1) to be joined by the link 10 that will be placed between the first end 13 and second end 15 of one of the elements 11 in close proximity to the aperture 14. The elements 11 will then be moved transversely of each other (as shown in FIG. 1) along the minor axis 17 to position the second end 15 of each of the elements 11 within the first end 13 and second end 15 of the other of the elements 11 and will thereafter be moved longitudinally of each other (as shown in FIG. 2) along the major axis 17 to engage the pins 12 and apertures 14 as well as the webs 18 and slots 23. After the transverse bores 24 and 25 in the pins 12 and members 21 and 22, respectively, have been aligned, a fastener such as the rivet 26 is secured in place in the bores 24 and 25 to lock the elements 11 together providing a unitary connecting link 10.

The elements 11 are so designed that normal tension stress tends to make their interconnection more secure. They are also contoured so that the fully assembled link 10 provides a smooth "normal" link in profile. It is also an advantage of my invention that the curved contour of the exterior surface of the first ends 13 protects against the link 10 being knocked apart. This feature together with little or no stress on the pins 12 and apertures 14 provide a construction which is in its strongest mode when under the normal tension stress. As a result, I have found that my connecting link 10 is at least as strong as the links such as 28 and 29 of the two sections of chain being joined.

While in the foregoing specification a detailed description of the features of my invention have been set forth for purposes of illustration, it will be appreciated by those skilled in the art that variations in the details herein given may be made without departing from the spirit and scope of the invention set forth in the appended claims.

I claim:

1. A connecting link comprising a pair of identical generally C-shaped elongated elements, each of said elements having an interior pin at a first end and an interior pin-receiving aperture at a second end, the interior of said first end of each of said elements being contoured to mate with the exterior of said second end of the other of said elements whereby said link is assembled by first moving said elements transversely of each other to position said second end of each of said elements within said first and second ends of the other of said elements and thereafter moving said elements longitudinally of each other to engage said pins and apertures.

2. The connecting link of claim 1 in which said pins and apertures have transverse bores alignable to receive a fastener after engagement of said pins and apertures.

3. The connecting link of claim 1 in which said first end of each of said elements engages a shoulder of said second end of the other of said elements with tension stress thereby being carried by said elements rather than by said pins and apertures.

4. The connecting link of claim 1 in which said link is oblong having a major axis and a minor axis with the transverse movement of said elements being in the direction of said minor axis and the longitudinal movement of said elements being in the direction of said major axis.

5. The connecting link of claim 4 in which said pins and apertures are cylindrical having their axes parallel to said major axis of said link.

6. The connecting link of claim 5 in which each of said pins has its outer cylindrical surface joined by a web to the corresponding one of said elongated elements adjacent said first end thereof.

7. The connecting link of claim 6 in which each of said apertures has its inner cylindrical surface slotted to receive said web of the other one of said elongated elements adjacent said second end thereof.

* * * * *